R. F. Patton,
Corn Drill.

No. 95,132. Patented Sep. 21, 1869.

2 Sheets. Sheet 1.

Witnesses.
Chas. H. Poole
Saml. J. Mott

Inventor.
Robt. F. Patton
by Prindle & Dyer
Attorneys

R. F. Patton,
Corn Drill.
No. 95,132. Patented Sep. 21, 1869.

Witnesses.
Chas H Poole
[signature]

Inventor.
Robt F. Patton,
by Prindle & Dyer
Attorneys.

United States Patent Office.

R. F. PATTON, OF QUINCY, OHIO.

Letters Patent No. 95,132, dated September 21, 1869.

IMPROVEMENT IN CORN-DRILL.

The Schedule referred to in these Letters Patent and making part of the same.

*To all whom it may concern:*

Be it known that I, R. F. PATTON, of Quincy, in the county of Logan, and State of Ohio, have invented certain new and useful Improvements in Corn-Drills; and do hereby declare that the following is a full, clear, and exact description of the same, reference being had to the accompanying drawings, making a part of this specification, in which—

Letters of like name and kind refer to like parts in each of the figures.

Figure 1:
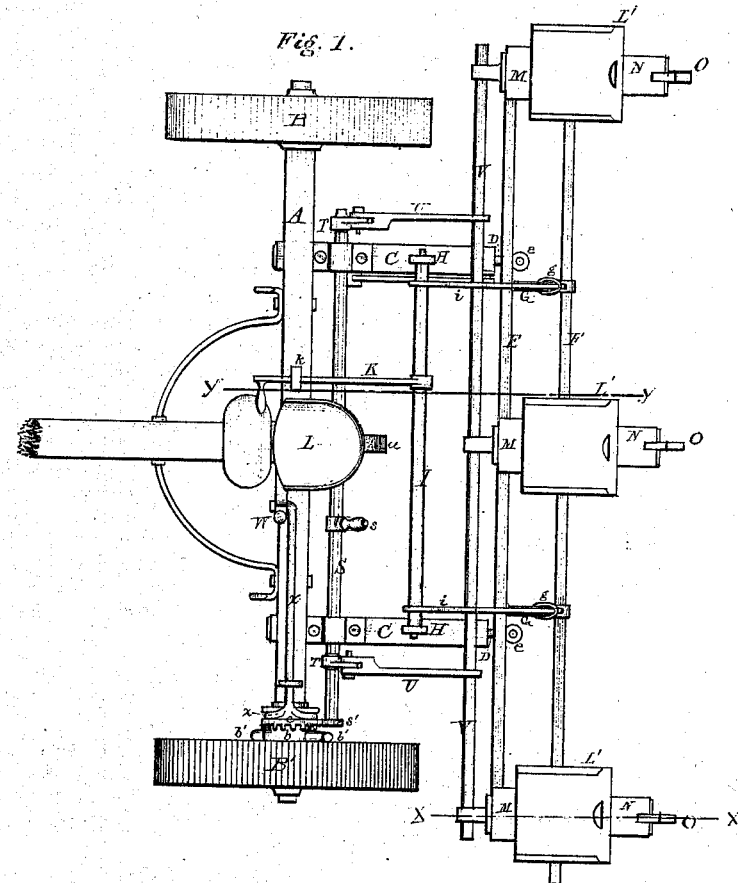
Figure 1 is a plan view of the upper side of my improved device.
Figure 2:
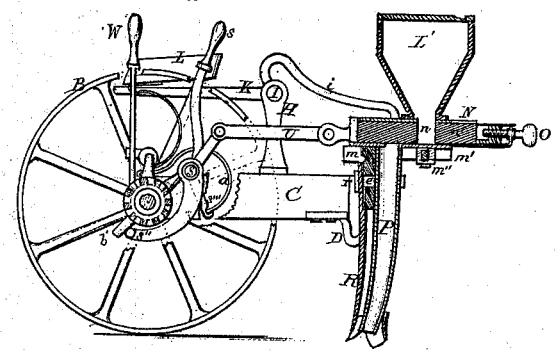
Figure 2 is an end elevation of the same, with the hopper and dropping-devices removed vertically on the line $x\ x$ of fig. 1.
Figure 3:
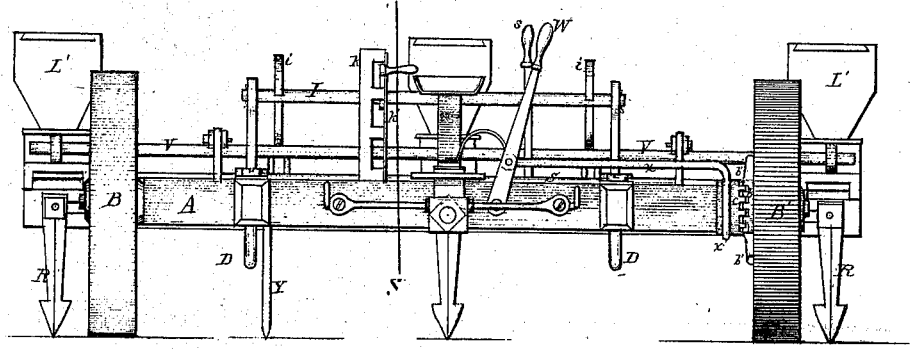
Figure 3 is a front elevation.
Figure 4:
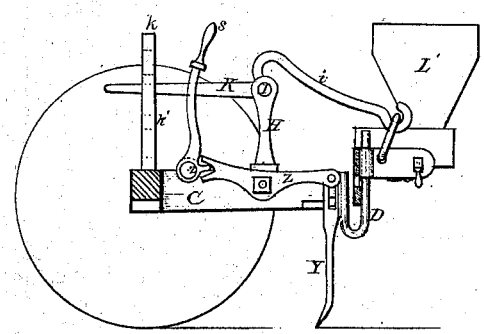
Figure 4 is a vertical cross-section on the line $y\ y$ of figs. 1 and 3.
Figure 5:
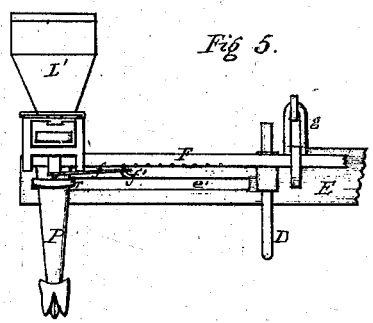
Figure 5 is a rear elevation of fig. 4.
Figure 6:
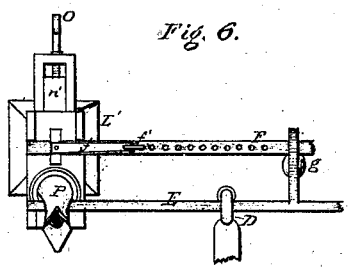
Figure 6 is a bottom view of the same.

My invention relates to a class of devices used for drilling or planting corn; and It consists principally in the construction of the dropping-devices, and of the means employed for regulating the quantity of corn dropped, and in connection therewith, of the means employed for regulating the lateral position of the outer drills and dropping-devices, so as to correspondingly vary the space or distance between the rows of corn.

It also consists in the means employed for connecting the drills and dropping-devices with the main frame, and for raising or lowering the same.

It also consists in the means used for actuating the dropping-devices, and for throwing the same "in or out of gear," as may be desired.

It also consists in the employment of a marker, so constructed and arranged as to impinge upon the ground at the instant that the corn is dropped; and, finally, It consists in the general construction and arrangement of the various parts of the device, as is hereinafter fully set forth.

In the annexed drawing—

A represents the axle, having suitably journalled upon its ends the ground-wheels B and B', the latter of which, being used for imparting motion to the dropping and marking-devices, is grooved across its tread, so as to enable it to adhere more firmly to the ground.

Secured to and projecting horizontally rearward from the axle A, are two bars, C and C', having attached to the lower side of each, near its rear end, a bar of iron, D, which curves downward and upward and forms a guide for the vertically-adjustable frame, to which the dropping-devices are attached, said frame consisting of two parallel strips, E and F, secured together by two cross-bars G, and provided with two sleeves, $e$ and $e$, attached to the rear face of the strip E, and fitting loosely over said guide.

Projecting upward from the bars C and C', near their centre, lengthwise, are two standards, H, having journalled in their upper ends a shaft, I, which is provided with two arms, $i$ and $i$, that each curve upward and rearward and terminate in a hook.

A link, $g$, secured within each cross-bar G, and passed over the hooked ends of said arms, enables the adjustable frame to be raised or lowered by rotating the shaft I, which operation is accomplished by means of a lever, K, secured to said shaft, and projecting forward, near the driver's seat L.

In order that the shaft and adjustable frame may be retained in position when adjusted, a bar, $k$, is secured vertically upon the axle, immediately against the lever K, and is provided with a series of notches upon its contiguous face, into which said lever may pass.

A spring, $k'$, attached at its end to the upper end of said bar, passes downward over the notches, and assists in retaining the lever therein.

As thus arranged, it will be seen that if the lever K is elevated or depressed, and placed within one of the notches in the bar, the adjustable frame will be correspondingly moved, and the whole firmly locked in position.

L' represents a hopper, secured upon the upper side and near one end of a box, M, the front and rear ends of which are open.

A slide, N, corresponding in size with the interior of said box, is placed therein, and is provided with a vertical opening, $n$, corresponding with that in the lower end of the hopper L, which opening $n$ may be diminished or increased in size by means of a block, $n'$, sliding lengthwise within a longitudinal groove within the slide N, and adjusted by means of a screw, O, suitably journalled within the rear end of said slide, and working into a corresponding nut in the rear end of said block.

The upper surface of the slide is covered by a thin spring, which being secured at its front end only, is so adjusted as to press upward against the opening in the hopper, and furnishes a yielding bearing-surface for said slide, causing it to work closely without binding.

An opening is provided in the bottom of the box M, near its forward end, through which the corn received from the hopper into the opening $n$ in the slide N may be discharged into the spout P, when said slide is pushed forward, so that said openings correspond.

The centre hopper and dropping-devices are permanently attached to the strips E and F, as is, also, the drill R, having immediately in its rear the spout P, but the outer dropping-devices must necessarily be made adjustable laterally, in order that the distance between the rows of corn may be varied.

In order to accomplish this object, the box M is provided with lugs $m$ and $m'$, which, when said box rests upon the strips E and F, project downward beside said strips, those in front, $m$, fitting into a longitudinal groove in the face of the strip and prevent the box from being raised, while the rear lugs $m'$ are vertical.

A third lug, $m''$, extends downward around the strip F, and, in connection with the forward lug, holds the box firmly down upon said strips or frame, while allowing it to move freely thereon lengthwise.

Attached to the lower side of the lug $m''$, is a spring, $f$, which projects inward, and has upon its inner end a pin, $f'$, which fits into one of a series of holes in the lower side of the strip F, and holds the hopper and box in place when adjusted.

The drill R is secured to the front side of the strips E, by means of a bolt, $r$, passing through said drill and through a longitudinal slot, $e'$, the rear end of said bolt $r$ being made in the form of a ring, and of sufficient size to contain the upper end of the spout P, so that as said spout and drill are upon opposite sides of said strip, it will be readily seen that that by tightening said bolt they will be firmly bound thereto.

S represents a shaft, suitably journalled in boxes upon the upper side of the bars C and C', immediately in rear of the axle.

Projecting upward from the shaft S, just outside of the bars C and C', are two arms, T and T, having pivoted to the upper end of each, one end of a rod, U, the opposite end of which is pivoted upon a bar, V, suitably attached to the front end of each slide U, so that by rocking said shaft in its bearings, a reciprocating motion will be given to said slides.

A lever, $s$, projecting upward from said shaft, near the driver's seat, furnishes a means whereby said shaft and slides may be operated by hand, but in order that the same result may be accomplished by means of the power used for drawing the machine, the following-described devices are employed:

The hub of the ground-wheel B is extended inward, and has fitted loosely thereon a band, $b$, which has projecting radially from its periphery two or more studs $b'$.

Upon the inner face of the band $b$ is provided a series of radial grooves corresponding with similar projecting teeth upon the contiguous face of a clutch, $c$, secured upon the hub, outside of said band, said clutch being connected with said hub by means of a key, so as to slide freely thereon longitudinally.

A lever, W, is pivoted at its lower end to the axle, within convenient reach of the driver, and has pivoted to itself, a short distance from its lower end, one end of a rod, X, upon the opposite side of which is a yoke, $x'$, fitting into a groove in the periphery of the clutch, so that by moving said lever transversely, a corresponding motion will be imparted to said clutch, which will be caused to engage with or be released from the band $b$.

Attached to the end of the shaft S is an arm, $s'$, that curves downward and forward beneath the clutch, and has secured within its end a pin or stud, $s''$, which projects outward at a right angle with the face thereof, and engages with the studs $b'$, upon the band $b$.

If, now, the machine be moved forward, and the clutch thrown into engagement with the band $b$, said band will be caused to revolve with the wheel, and as the studs successively strike against the pin $s''$, it will be pressed backward sufficiently to allow said stud to pass, by which means the shaft will be partially rotated, and the slides N drawn forward.

The shaft S is returned to place, when the pin $s''$ is released, by means of a curved spring, $a$, secured at one end to the axle, and at the other to an arm, $s'''$, projecting downward from said shaft, near its centre, lengthwise.

It being desirable that the rows should be accurately marked, so that no mistake can occur in starting again, a marker, Y, is so attached to one of the bars, B, on a line with the drills, as to have a vertical motion only.

Pivoted to the upper end of said marker is one end of a lever, Z, which is in turn pivoted at its centre to said bar, and extends forward to or near the shaft S.

The forward end of the lever Z has a V-shaped notch, which fits over a short cam-arm, $z$, projecting rearward from the shaft S, so that each motion of said shaft correspondingly moves said lever and marker, the adjustment of the parts being such as to cause said marker to impinge upon and mark the ground at the precise instant that the corn is dropped, after which it is as quickly raised.

It is believed that from the general construction and arrangement of the several parts of this device, great strength, durability, and convenience will result, and that from the certainty and ease with which it performs its office, its general adoption will follow its introduction to the public.

Having thus fully set forth the nature and merits of my improvement,

What I claim as new, and desire to secure by Letters Patent, is—

The slide N, provided with an opening, $n$, made adjustable by means of a block, $n'$, and screw O, in combination with the box M and hopper L, substantially as described, and for the purpose set forth.

Also, the means employed for securing to the frame, and rendering adjustable laterally, the outside hoppers and dropping-devices, consisting of the lugs $m$, $m'$, and $m''$, secured to and projecting downward from the box M, and the spring $f$ secured to the lug $m''$, and provided with a pin, $f'$, which engages with a series of holes in the lower side of the strip F, substantially as shown and specified.

Also, the means employed for securing to the frame, and rendering adjustable thereon laterally, the drill R and spout P, consisting of the bolt $r$, provided with the ring-shaped head, and working through the slot $e'$, in the bar E, substantially as and for the purpose specified.

Also, the means employed for connecting the drills and dropping-devices with the main frame, and rendering them adjustable vertically, consisting of the guides D, secured to the rear ends of the bars C and C', the sleeves or thimbles $e$, attached to the strip E, the shaft I, journalled within the standards H, and provided with the arms $i$, and connected to the adjustable frame by means of the links $g$, the lever K, the notched bar $k$, and the spring $k'$, substantially as herein shown and described.

Also, the means employed for operating the dropping-devices, consisting of the shaft S, provided with the arms T, $s$, and $s'$, the pin $s''$, the rods U, the bar V, the band $b$, provided with the studs $b'$, the clutch $c$, and the curved spring $c'$, all constructed and arranged substantially as and for the purpose specified.

Also, the marker Y, operated by means of the lever Z and cam-arm $z$, substantially as shown, and for the purpose set forth.

Quincy, Logan county, Ohio, June 12, 1869.

R. F. PATTON.

Witnesses:
JNO. BELL,
LEVI RITTER.